(12) United States Patent
Palay et al.

(10) Patent No.: US 7,868,873 B2
(45) Date of Patent: *Jan. 11, 2011

(54) SURFACE AND CORDLESS TRANSDUCER SYSTEM

(75) Inventors: Steven M. Palay, Cave Creek, AZ (US); James L. Rodgers, Mesa, AZ (US)

(73) Assignee: Wacom Co., Ltd., Saitama (JP)

( * ) Notice: Subject to any disclaimer, the term of this patent is extended or adjusted under 35 U.S.C. 154(b) by 582 days.

This patent is subject to a terminal disclaimer.

(21) Appl. No.: 10/598,460

(22) PCT Filed: Apr. 1, 2005

(86) PCT No.: PCT/US2005/011577

§ 371 (c)(1), (2), (4) Date: Aug. 31, 2006

(87) PCT Pub. No.: WO2005/096772

PCT Pub. Date: Oct. 20, 2005

(65) Prior Publication Data

US 2007/0177533 A1   Aug. 2, 2007

(51) Int. Cl.
- G06F 3/041 (2006.01)
- G06F 3/033 (2006.01)
- G06K 11/06 (2006.01)
- G08C 21/00 (2006.01)

(52) U.S. Cl. ............ 345/173; 345/179; 178/18.01; 178/18.03; 178/19.01; 178/20.01

(58) Field of Classification Search ......... 345/173–179; 178/18.01–20.04
See application file for complete search history.

(56) References Cited

U.S. PATENT DOCUMENTS

| | | | |
|---|---|---|---|
| 4,786,765 A | | 11/1988 | Yamanami et al. |
| 4,848,496 A | * | 7/1989 | Murakami et al. ....... 178/18.07 |
| 4,902,858 A | * | 2/1990 | Yamanami et al. ....... 178/18.07 |
| 5,028,745 A | * | 7/1991 | Yamanami et al. ....... 178/18.07 |
| 5,138,118 A | | 8/1992 | Russell |
| 5,349,139 A | | 9/1994 | Verrier |
| 5,475,401 A | | 12/1995 | Verrier |
| 5,600,105 A | * | 2/1997 | Fukuzaki et al. ......... 178/19.06 |

(Continued)

FOREIGN PATENT DOCUMENTS

CN    88 1 04538 A    12/1988

(Continued)

Primary Examiner—Bipin Shalwala
Assistant Examiner—Ilana Spar
(74) Attorney, Agent, or Firm—Seed IP Law Group PLLC (57) ABSTRACT

A smart surface is disclosed that can stand alone or be contained within a portable computer or other system, for powering and communicating with single or multiple cord-free transducers. Operating or charging power is transmitted by the surface using a carrier signal that is on/off keyed or amplitude modulated with synchronization, clock, enable, address, modes, commands and other pulse width, encoded or digital data. The signal is transmitted to single or multiple cordless smart transducers located on or above the surface, such as pens with multiple pressure sensing and switch capability, pointers, stylus, cursors, pucks, mouse, pawns, implements and similar items. Overlapping resonant inductive circuits are used in the surface to transmit operating power and communicate data to the transducer(s).

16 Claims, 6 Drawing Sheets

U.S. PATENT DOCUMENTS

| | | | |
|---|---|---|---|
| 5,600,720 A * | 2/1997 | Iwamura et al. | 380/1 |
| 5,661,269 A | 8/1997 | Fukuzaki et al. | |
| 5,679,930 A * | 10/1997 | Katsurahira | 178/19.06 |
| 5,693,914 A | 12/1997 | Ogawa | |
| 5,706,000 A | 1/1998 | Fukuzaki et al. | |
| 5,856,639 A | 1/1999 | Landmeier | |
| 6,002,387 A * | 12/1999 | Ronkka et al. | 345/157 |
| 6,005,555 A * | 12/1999 | Katsurahira et al. | 345/174 |
| 6,020,849 A | 2/2000 | Fukuzaki | |
| 6,556,190 B2 | 4/2003 | Fleck et al. | |
| 7,423,629 B2 * | 9/2008 | Oda et al. | 345/156 |
| 2001/0006383 A1 * | 7/2001 | Fleck et al. | 345/179 |

FOREIGN PATENT DOCUMENTS

| | | |
|---|---|---|
| EP | 0 295 699 A2 | 12/1988 |
| JP | 52-57727 A | 5/1977 |
| JP | 59-16317 A | 1/1984 |
| JP | 63-70326 A | 3/1988 |
| JP | 1-320521 A | 12/1989 |
| JP | 2-45819 A | 2/1990 |
| JP | 2-48724 A | 2/1990 |
| JP | 5-35395 A | 2/1993 |
| JP | 5-119908 A | 5/1993 |
| JP | 7-323109 A | 12/1995 |
| JP | 8-278844 A | 10/1996 |
| JP | 8-286815 A | 11/1996 |
| JP | 2002-297300 A | 10/2002 |
| JP | 59-3537 A | 1/2009 |

* cited by examiner

SURFACE AND CORDLESS TRANSDUCER SYSTEM

FIELD OF THE INVENTION

The present invention relates to a transducer powering, communication and position resolving smart surface that transmits operating power that is encoded with address, instructions, modes, commands, synchronization and other data, to single or multiple cordless transducers, such as a pressure sensitive pen, located on or above the surface. Transducer(s), such as a pen, when enabled, transmit back to the surface encoded analog signals that can be used by an enclosed tablet for determining coordinate location and for outputting receiving ID, status and other digital data to the surface controller, processor or host computer.

BACKGROUND

The enclosed system, in operation with position resolving or tablet capability, serves the purpose of electronically reproducing pen handwriting, printing, sketching, drawing, menu and item selection as well as providing for the transmission from the pen or other transducer stored signatures or codes that can be compared with current writing, writing pressure or system codes for security and authorization purposes. Conversely, the surface can transmit digital data and information to the pen or receive data and information from the pen for other purposes. For example, if the pen receives information from one surface and is transported to another surface, the pen can then transfer or send the information to the other surface and associated computer system. This allows a convenient and rapid means of transferring a file from one system to another.

A number of pawns or other locating devices can be employed to represent graphic items such as trees, bushes or other items in a landscape drawing or rendition as the pawns can be moved around as a means to determine their optimum location. Alternatively, pawns or other items can be assigned as schematic symbols or numerous other items as a means to construct schematics, graphic or other position based information. If desired for some applications, the information and data transmitted to and received from the transducer or pen or can be encrypted for security purposes.

Accordingly, it is an object of this invention to efficiently provide a system and method, in a powering, communication and position-resolving surface using resonant circuits or coils, requiring minimum input power to transmit sufficient power or energy to simultaneously operate a number of cordless moveable smart transducer(s), such as a pressure-sensitive pen, on or above the surface.

It is a further object of this invention to provide a system and method capable of transmitting a wide range of analog and digital status and other information to and from the transducer(s), based on their individual characteristics and requirements.

It is a another object of this invention to perform the above functions and operation with the use of an independent or generic tablet incorporated within the surface to determine the transducer(s) position with immunity to noise and interference.

Still another object of this invention is to permit operation of a portable computer, PDA, terminal or other device or system that may have a display, lighting and other components within close proximity of the surface.

SUMMARY OF THE INVENTION

The overall system includes a surface having a transmit power or charging and data signal capability, a transducer or pen for receiving the power and data, and, in response, for transmitting back a position resolving signal and data such as pressure or switch status, and a tablet that resolves the transducer position from the signal and, in operation with the system, outputs the received data from the pen or other transducer for detection and processing by the system. Covered herein are the methods and means of sending power and data from the surface to a transducer or multiple transducers, the transducer operation, and the methods and means of detecting and decoding the signal and data received back from the transducer. The tablet coordinate position resolving capability utilizes an available or generic surface grid and surface system design whose detail design and methods for resolving coordinate position are presently known and, are not part of this invention except as a system component. The pressure sensor used in a pen or other transducer is also of a generic design where the detail design and methods are also presently known and merely used herein as a system component.

The enclosed system operates with a number of transducers including pens, pointers, cursors, pucks, mice, pawns, implements and similar items. However, each of these devices has unique requirements and needs. For example, a pen used for handwriting must operate at fast or high-slew speeds with minimum static, dynamic, impulse, pen down and tilt errors in order to be able to accurately reproduce handwriting—the handwriting being electronically resolved using a tablet by determining the pen position coordinates as it moves on the surface.

In a pen, the power and communication electromagnetic coil circuits have a very small diameter in order to fit within the pen dimensions, and as a result, it has a small amount of magnetic coupling with the surface and, therefore, receives and transmits very low power. On the other hand, cursors, pucks, mouse, pawn and other implements do not need to move at such high speeds, do not have an angular or tilt error since they lay flat on the surface, and the transmit and receive circuit(s) often can be a much larger diameter for increased coupling with the surface, and as a result, they can receive and send much higher power or signals.

Therefore, it is advantageous to have adaptable communication formats that transmit to and receive back data and information from each transducer based on its individual characteristics or status. Normally only one "fast" handwriting pen is used on the surface at one time, wherein a number of "slow" moving pawns may be used simultaneously. The pen, since it has less power, may need to employ extremely low-power control circuitry or low-speed processor, wherein, a larger pawn or other device may inherently have greater power available, allowing higher speed processing.

For the pen with reduced power it is necessary to have lower-speed circuit with resulting simpler address, enable or other commands that it can discern, however, the pawn or other device with higher power may be able to handle higher speed and more complex data and information. However, these properties are consistent with having perhaps one "fast" pen on the surface and a dozen "slow" pawns, wherein, the higher number of pawns means they need more complex communication to address or identify them than is necessary with a single pen. Therefore, multiple communication formats are defined herein to meet these varied requirements.

BRIEF DESCRIPTION OF THE DRAWINGS

The present invention may more readily be described by reference to the accompanying drawings in which.

The surface of the present invention contains a series of overlapping transmit resonant inductive based coils or loops, that when enabled by self-resonance, or driven by an external AC signal source, individually or in a pattern, creates a radiating electromagnetic field that powers or charges the transducer(s) in a manner having increased voltage amplitude over non-resonant methods. The surface transmit power, using a powering analog carrier signal that is on/off and/or amplitude modulated to represent pulse width, pulse position or an encoded digital pattern that, in turn, is used to power and to address, enable, synchronize, control, or otherwise send data or other information to the transducer. Less power is required in the surface because of the properties of current multiplication associated with resonance. A microprocessor, controller or computer controls, enables and modulates the transmit power and data signal in accordance with defined modes of operation and communication formats.

It is not necessary that the transmit grid be in both X and Y directions as only one direction is required. In addition, a single grid can be placed at an angle such as 45° relative to X and Y directions. This is because the transmit grid has no position resolving functions but only serves to transmit power and data to the transducer or pen. However, for faster speed of operation it is possible to utilize both X and Y directions and then only resolve the transducer or pen position within close range of the transmit signal. This will reduce the number of receive coils or grids that need to be read for data and increase the rate of operation. However, the position is totally resolved by the tablet not the transmit function.

In one embodiment a stable signal source provides a square wave, sine wave, triangle wave or other similar waveform to drive the transmit loops in the surface. The resonant characteristics of the transmit loops on the surface convert the waveform to a substantially sinusoidal form. The source can be derived from a source such as a processor clock and divided down as required to an appropriate operating frequency or can come directly from a crystal or resonator based oscillator. The signal source is then gated off, along with the grid loops, if desired, when signals are being received from a transducer in order to minimize background noise and interference in the tablet receiving coil pickups and circuitry. The signal from one of the above described signal sources are then gated to the appropriate surface loop, generally one at a time, under control of a processor and program.

Since the surface coils or loops are resonant, they do not turn off quickly. Therefore, it is necessary to squelch or short them out in order to stop the signal transmission in a rapid fashion. Otherwise the transmission signal will be artificially lengthened and will turn off slowly, making its detection more difficult in the transducer. This is accomplished by means of a shorting transistor or circuit that shorts out the tuned circuit under processor or controller control at the end of a transmission. The same circuit used to provide the drive signal can also serve to short out the resonant coils or it can be a separate circuit.

The drive can be serial where the grid resonant circuit is a low-impedance drive that drives a series resonant circuit where the resulting drive signal developed across the coil is much higher than the drive signal.

Alternatively, the drive can be higher impedance parallel drive circuit output that is directly driven or transformed by an impedance matching capacitor to parallel resonant coil circuits. In the tablet, since the grid does not have to be low-impedance to provide driving power, and if transparent grid material such as tin oxide is utilized, the grid can be placed on the top of a display for closer proximity to the pen or other transducer.

The operation and efficiency of the resonant surface coils compared to non-resonant circuits are substantial. In the case of the resonant circuit, energy is transferred back and forth between an inductor (in this case a coil loop or loops on the surface) and a capacitor(s). Once resonance is achieved, it is only necessary to provide additional current to account for losses in the circuit caused by the equivalent series resistance in the circuit. The amount of current multiplication can be defined by the Q or quality quotient of the circuit that is defined as the ratio of the impedance of the inductance divided by the value of the equivalent series resistance (XL/Rs).

The equivalent series resistance value includes all the resistance in the circuit including the actual coil series resistance, a resistor added to the intentionally reduced Q, parallel resistance, loading caused by the transducer(s) on the surface, the dielectric characteristics of surrounding material, shielding of the magnetic field caused by metallic surfaces in close proximity and other environmental factors. The higher the Q the higher the resonant current that can also be called current multiplication—the multiplication of the current beyond what the current would be if there were no resonance.

It is important to understand that the current is increased and the resulting magnetic field is increased a proportional amount by the use of resonance. However, the laws of conservation dictate that you cannot transmit more power and the transducers cannot receive more power than is actually supplied to the surface resonant circuits minus all losses. In this case, the transducers are very loosely magnetically coupled or otherwise have a low-coupling coefficient so they do not significantly load down the surface circuits, otherwise, they do not increase the series resistance of the transmit resonant circuit(s) and reduce the Q significantly.

The overall result is that the signal voltage level of the receiving transducer is substantially increased by the current multiplication of the transmitting resonant circuit even while its actual power receiving capability is not. However, having a high voltage level in the transducer, while requiring less power to operate the surface is a major advantage, particularly in portable applications, such as when the surface is contained within a portable computer, PDA, terminal or other battery operated device. The voltage level in the transducer reaches sufficient levels that it allows the operation of very low-power digital logic and processor circuit.

The surface consists of overlapping parallel coils or loops in the X or Y direction of the position resolving area of the surface. Parallel transmit coils can be utilized in the X direction only, in the Y direction only or in a direction that is at a 45% degree angle to the X and Y directions.

Additionally, coils can be used in multiple directions if they are not operated at the same time. In a typical embodiment, the parallel wires of each side of one coil are roughly about 5 centimeters apart in the direction that coils are placed. One coil is then overlapped by another parallel coil roughly 30 to 50%, wherein, a coil overlapped by 50% has one side of a parallel coil or coils in its center. These numbers can vary substantially even beyond the numbers provided based on the height of the transducers above the coils, the diameter of the transducer tuned circuit and other factors.

The surface also contains a tablet receive grid that employs non-resonant coils or loops in the X and Y direction. The tablet employed is generic or non-specific in nature and the means that it employs to resolve the transducer or pen position is not part of the present invention. However, it is assumed to have a grid, coil or wire pattern used for position determination that also can be used to pick up the transmitted digital and other information for use in surface receive operation. The surface transmit coils are independent of the receive tablet coils and are not utilized for position resolving. The same coils used for determining the transducer coordinate position are also used to receive and detect transducer status and data transmissions. Received signals are amplified, detected and converted to digital data that then is processed by a microprocessor, controller or computer. In a common tablet configuration, the surface received signal is filtered, amplified, detected and converted to a DC voltage that is proportional to the received signal amplitude.

An effective method to convert the AC signal to a DC voltage is the use of an integrator where during the time the transducer signal is being received, where the integrator, starting from a zero voltage, is allowed to charge to a level that is representative of the signal amplitude. A small signal results in a charge to a low voltage level and a large signal results in a charge to a high voltage level in a proportional amount.

During the time the transducer signal stops and the surface is transmitting, the integrator charge is changed in polarity and a fixed reference discharge voltage is implemented. The time that it takes for the integrator to discharge back to zero is then proportional to the amplitude of the transducer signal that charged the integrator. This time or period is measured, the received transducer signal amplitude calculated, and from the amplitude of the signals received by multiple tablet loops in the surface, and the coordinate position can be determined. In addition, the tablet circuitry can receive amplitude modulation and convert it to digital data in order to resolve transducer status and other digital data. It is not necessary that the transmitted signal from the transducer be continuous since the integrating conversion process does not require a signal during the period the reference signal is used for discharge.

The position resolving circuitry can operate on the signal for a period such as 250 microseconds, providing time for the received signal to fully reach its maximum value and then stop reading the signal before it turns off for either logic condition. This means the position resolving circuitry is not affected by the variable length of the transmission as long as the transmission exceeds a minimum length. On the other hand, status or data resolving circuitry can determine the length or the presence or absence of signal at the end of the period in order to determine the logic status of the transmission.

When enabled and/or on/off modulated, resonant transmission loops or coils within the surface transmits power or a charging signal, using an electromagnetic medium having a carrier operating at about 470 KHz, in a typical configuration, as well as on/off modulated with synchronization, enable, address, control, instruction and other information to one or a multitude of transducers or pens. Before the initial surface transmission begins, or if the pen is out of operating range or proximity of the surface, the pen is not powered, is not enabled, and does not actively operate or transmit a signal.

The transducer or pen has a transceiver tuned resonant inductive or coil circuit, that is initially passive, and when activated upon receipt of a surface power or charging signal, resonates, and in operation with two diode rectifiers and a storage capacitor or filter, creates DC operating power. Upon transmission from the surface of an initial power and a synchronization or sync signal, the transducer or pen, if within range or proximity, charges up with operating power.

If the power and sync signal is of the proper amplitude, as determined by adequate power to operate the pen circuitry, and a threshold or sync detector that determines that the signal has reached a minimum threshold level, that represents a logic 1, and if the period of the sync pulse length before it goes off, that represents a logic 0, is within a predetermined period, including a tolerance for uncertainty, then a processor or controller enables the pen for further operation.

After the surface transmission sync signal stops, and after a small delay, the pen transmits back to the surface an electromagnetic response signal, using the same transceiver tuned resonant inductive circuit used to receive power and signals from the surface, that is enabled and/or on/off modulated, to operate as an active self-resonant oscillator or transmitter source to the surface. Alternatively, the circuit to transmit a signal can be a separate circuit from that used to receive the powering signal from the surface and it can be driven by an external signal source or oscillator that can be used in a similar manner, under pressure or digital control, to transmit a position resolving signal, ID, status, received signal level or other data to receive coils in the surface.

The pen or other transducer signal is used to detect the coordinate X and Y direction position relative to a tablet contained within the surface, and it communicates status such pen tip pressure, side-switch, or other data or information.

The larger diameter and sometime closer proximity of the coil with the surface of a cursor or similar larger diameter transducer, and the resulting greater electromagnetic coupling with the surface, means that it can receive excess signal and act as an excess load if not compensated for this property. Therefore, large diameter transducers, compared to smaller diameter transducers such as a pen, may be implemented with different configurations or embodiments. For example, in a pen it is a common practice to tap off the end(s) of a tuned circuit in order to achieve as high a powering voltage as possible. However, in order to do this it is also necessary to dramatically minimize the current drain of the pen in order to not load the tuned circuit excessively.

In the case of a cursor, puck or similar device, the power tap off the tuned circuit can be made at other than the coil end points, for example, halfway between the end points and ground reference. This is because excess input voltage may be available and, therefore, a lower tap position can be used to provide sufficient voltage to the enclosed circuitry. In the case of the tap at a halfway point, the load on the overall tuned circuit is reduced by a ratio of 4 to 1. This means the cursor is less of a load to the powering surface and/or more power is available to operate circuitry in the cursor, compared to a pen. In some cases, it is possible to make,e the power receiving circuitry un-tuned or non-resonant and receive sufficient voltage and power.

While the load of a transducer such as a cursor can be kept to a minimum the digital control of transducers on the surface means that only one at a time is enabled to be utilized or communicated with. The one exception to this is the pen or pointer stylus that is generally allowed to operate at all times in order to maintain high operating speed, to minimize communication needs since it has less operating power and needs to employ lower speed processing, since only one such writing device is used on the surface at a time. The surface sends out address and enable commands that turn on other appropriate transducers individually since they may be used in significant numbers on the surface. Therefore, the overall power loading on the surface of multiple large diameter transducers is further reduced since they are enabled to transmit only one at a time.

The pen is implemented in standard and high-performance versions or embodiments that both have a pressure sensing tip and a side switch capability. The high-performance version contains a 16-bit microprocessor that allows advanced features such as data storage and security encryption, a multi-transducer mode (allowing more than one pen to be active on the tablet at a given time), and additional multiple pressure or other sensing elements within the pen, such as pressure-sensing side-switches or an eraser.

Other transducers such as a mouse, pawn, puck and other transducers are configured and operate in the same maimer as the high-performance pen. However, they may be equipped with a keypad, visual and other indicators, additional switches or pressure sensors, and multiple tuned circuits that can be used to determine their position as well as angular direction. In addition, they may be equipped with a higher-speed processor, expanded memory, expanded address capability and other features and capabilities since they generally have a larger coil and can receive more operating power. Otherwise, their operation is identical to that described below for the high-performance pen with additional modes and operating commands.

The pen or other transducers receive a powering or charging and synchronizing or "Sync" signal via a set of loops within the surface grid. The standard pen, high-performance pens and other transducers use the length of this sync signal to decode the information being conveyed by the surface. The pen or other transducer then communicates the required responding information by time keying or on/off modulation the pen or other transducer transmit drive signal.

In normal operation, the pen or other transducer is in a "Standby Mode", in that it does not normally transmit any signals when it is awaiting a command from the tablet. This allows the transceiver coil in the pen or other transducer to detect the incoming signal. While the "Sync" signal is present, the transceiver coil absorbs the resonant charging energy and causes the transceiver tuned circuit in the pen or other transducer to resonant.

The pen or other transducer has as a transceiver tuned resonant inductive or coil circuit, that is initially passive, and when activated upon receipt of a surface power or charging signal, resonates, and in operation with two diode rectifiers and a storage capacitor or filter, creates DC operating power. Upon transmission from the surface of an initial power and a synchronization or sync signal, the pen or other transducer, if within range or proximity (Prox is On), charges up with operating power.

If the power and Sync signal is of the proper amplitude, as determined by adequate power to operate the pen or other transducer circuitry, and a threshold detector that determines that the signal has reached a minimum threshold level, that represents a logic 1, and if the period of the sync pulse length before it goes off, that represents a logic 0, is within a predetermined period, including a tolerance for uncertainty, then a processor or controller enables the pen or other transducer for further operation.

After the surface transmission Sync signal stops, and after a small delay, the pen transmits back to the surface an electromagnetic response signal, using the same transceiver tuned inductive resonant inductive circuit used to receive power and signals from the surface, that is enabled and/or on/off modulated, to operate as an active self-resonant oscillator or transmitter source to the surface. Alternatively, the circuit to transmit a signal can be a separate circuit from that used to receive the powering signal from the surface and it can be driven by an external signal source or oscillator that can be used in a similar manner, under pressure or digital control, to transmit a position resolving signal, ID, status, received signal level or other data to receive coils in the surface.

The pen or other transducer signal is used to detect the pen or other transducer coordinate X and Y direction position relative to a tablet contained within the surface, and it also communicates the status of such pen tip pressure, side-switch, keypad, or other data or information. An example of the power or charging and sync signal is shown in FIGS. 1*a* and 1*b*.

Figure 1A:
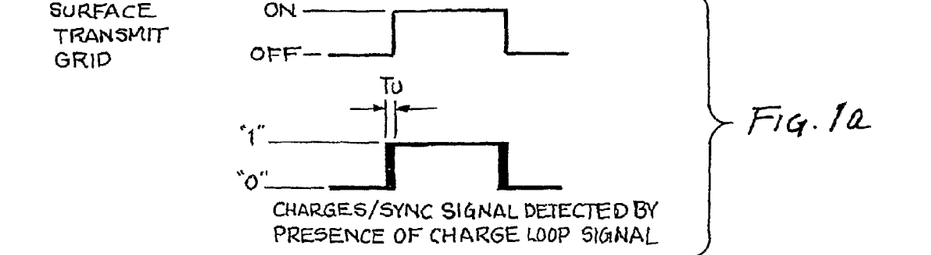
FIG. 1a is a representation of a sync signal illustrating the existence of an uncertainty period in the receipt of the signal by a transducer such as a pen.
Figure 1B:
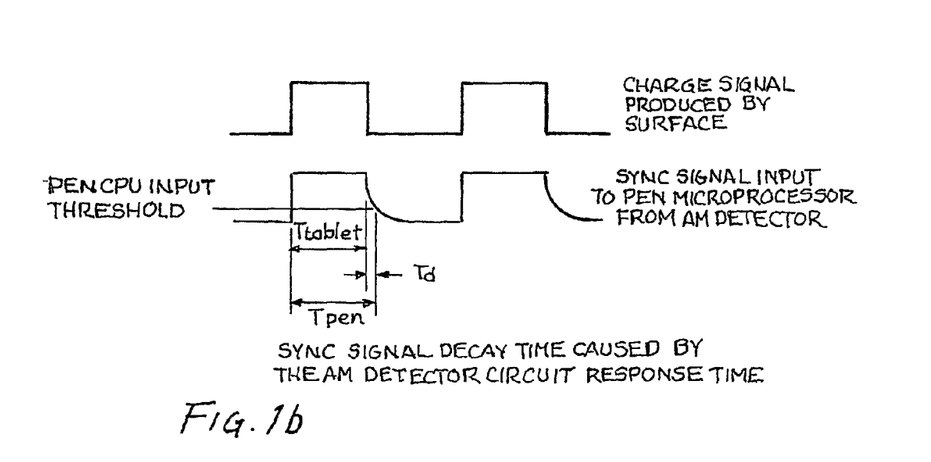
FIG. 1b is a representation of a sync signal illustrating the decay time caused by circuit response time.

An example of the tablet's transmitted signal and pens or other transducer's received "Sync" signal is shown in FIG. 1*a*. As seen in FIG. 1*a* the Sync signal is in a binary '1' state during the presence of the charging signal, and a '0' state when the charging loop is off. Due to the clock rate of the microprocessor in the high-performance pen, there will be an uncertainty period (Tu) of approximately 15 μs when locking onto the Sync signal. By designing the valid sync pulse lengths to be much greater than the uncertainty period, this effect is minimized and will not cause any performance issues in the pen. In FIG. 1*b*, it can be seen that the duration of the sync pulse received by the pens or other transducer's microprocessor is actually stretched. For any sync pulse emitted by the surface's transmitting grid, the pen or other transducer sees an added duration Td of approximately 12 μs. All timing parameters referred to in this specification refer to the time Tpen as seen by the pen's or other transducer's microprocessor.

The Sync pulse signal uses two timing conditions for the standard pen and three timing conditions for the high-performance pen or other transducer, to enter information into the pen. The timing conditions can be expanded for other transducers but operate in the same or similar manner.

Figure 2:
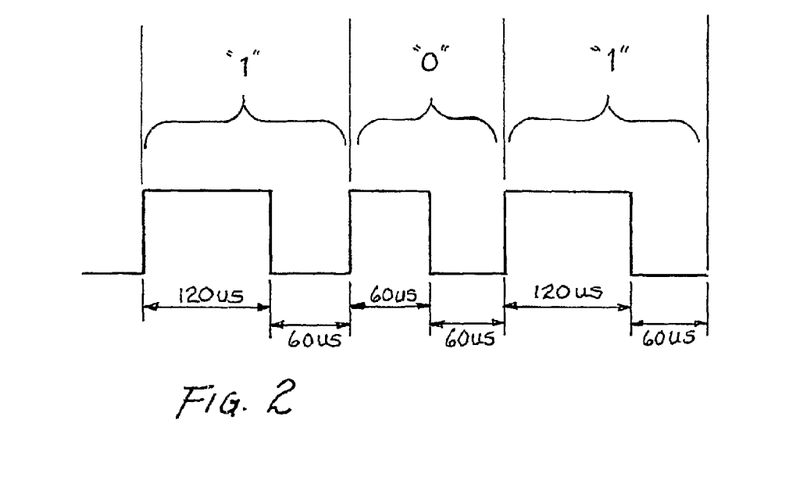
FIG. 2 is a representation of sync pulses forming a pattern of a command.

Clock data consists of a single Sync pulse with duration of 325 μs. In the standard pen, it is used to instruct the pen to transmit pressure data and the state of the side-switch. In the high-performance pen or other transducers, it is used to clock binary data out of the pen one bit per Clock Data pulse. Once all the data is clocked out of the pen or other transducer, further clock pulses will force the pen to transmit binary '0's Mode Select consists of a series of 6 Sync pulses whose high-time determines the binary state for each pulse (see FIG. 2), and there must be a 60 μs gap between each sync pulse. It is used only in the high performance pen or other transducers. The Sync pules are used to configure or request specific information from the high-performance pen. The operating modes for the pen will be discussed more fully hereinafter.

Load Data is a single Sync pulse with duration of 440 µs.

It is used only in the high-performance pen to:

1. Instruct the pen to reset the binary data byte being transmitted from the pen to the surface.

2. Prompt the pen to transmit pressure (if enabled).

3. Enter a new command mode (if any) into the pen—the pen then executes the new command mode following the completion of the current LOAD DATA pulse.

Used only in the high-performance pen or other transducers, the mode commands are sent by the surface to configure or setup the pen or other transducers. The pen or other transducer is placed in a power-up default mode whenever it first comes into tablet proximity.

The setup commands sent to the high-performance pen or other transducers are broken into three different mode commands, as follows:

1. '11xxx' is the Enable Command. It is transmitted to every pen or other transducer in proximity of the tablet. The pen or other transducers located in proximity with matching 3-bit IDs will be enabled and will respond to all future communications while all other transducers will remain in a standby mode.

2. '10xxx' is the Disable Command. It is transmitted to every pen or other transducer in proximity of the tablet. The pen located in proximity with a matching 3-bit ID will be disabled and will ignore all future communications until an enable command with a matching 3-bit ID is received. The ID code can be expanded beyond 3-bits if desired for other transducers.

3. '0xxxx' is the Mode Command. It will place the currently-enabled pen or transducers into the mode sent with this command following the next "LOAD DATA" sync pulse. All other pens or other transducers in proximity will remain unchanged.

Note: Mode command '00000' is treated as meaning "no-changes" to the current pen or other transducer mode.

The different operating modes of suitable high-performance pens and other transducers will now be described. In some cases, the same modes used in the pen are used in other transducers dependent on how they are equipped. If they are equipped with a pressure sensor then the same pressure sensor command defined for the pen may be used.

Mode #1: Standard pressure pen (default mode)
Mode-select bits: "00001"
Description: The pen outputs one conversion of pressure data, followed by 8 bits of binary data (one for each CLOCK DATA pulse, beginning with the least-significant-bit) as defined herein. After transmitting 8 bits of data the pen will transmit binary data '0's until a "LOAD DATA" pulse is sent, at which time the mode will repeat itself with a new pressure conversion and an updated 8 bits of binary data. During the transmission of pressure data, pen position data cannot be obtained—length of time the pen transmits a signal (related to pressure) is insufficient for a wire conversion.

Mode #2: Binary-data only
Mode-select bits: "00010"
Description: The pen transmits 1 bit of binary data for each "CLOCK DATA" pulse, starting with the least-significant bit. A total of 8 bits are shifted, after which binary data '0' will continue to be shifted until a "LOAD DATA" pulse is sent to the pen. This is the best mode for finding pen proximity, as every responding data bit from the pen allows a wire to be converted into position information.

Mode #M3: Reserved for future design considerations.
Mode-select bits: "00101"
Description: To be determined.

Mode #4: Write encryption data
Mode-select bits: "00100"+ encryption data
Description: Updates the encryption data contained within the pen. Each bit of the encryption data is clocked into the pen with a "CLOCK DATA" pulse. This command only works with pens equipped with flash-memory microprocessors.

Mode #5: Read encryption data
Mode-select bits: "00101"
Description: Instructs the pen to transmit its encryption data. Each bit of the encryption data is clocked out of the pen with a "CLOCK DATA" pulse. This command only works with pens equipped with flash-memory microprocessors.

Mode #6: Future—Alternate pressure sensor single data conversion.
Mode-select bits: "00110"
Description: The pen outputs one conversion of an alternate (or secondary) pressure sensor immediately following the mode command. The pen then reverts to the previously selected mode command. During the transmission of pressure data, pen position data cannot be obtained—the length of time the pen transmits a signal (related to pressure) is insufficient for a wire conversion.

Mode #7: Reserved for future design considerations.
Mode-select bits: "00111"
Description: To be determined.

Mode #8: Update pen ID
Mode-select bits: "01xxx"
Description: Changes the ID of the currently selected pen to the 3-bit ID transmitted within the Mode-select bits. The pen stops responding after completion of this command until a new pen ID command is sent with the new matching ID. Usage of the flash-memory version of the microprocessor versus the processor will determine if the pen retains this information when out of proximity.

Mode #9 through Mode #14:
Reserved for additional pen or other transducer modes.
Mode-select bits: "01xxx"
Description: To be determined.

Mode #15: Reset pen or other transducer
Mode-select bits: "01111"
Description: Resets the pen or other high performance transducer to its default condition.

Such high performance pens or transducers may use communication formats such as those described below.

Figures 3, 5:
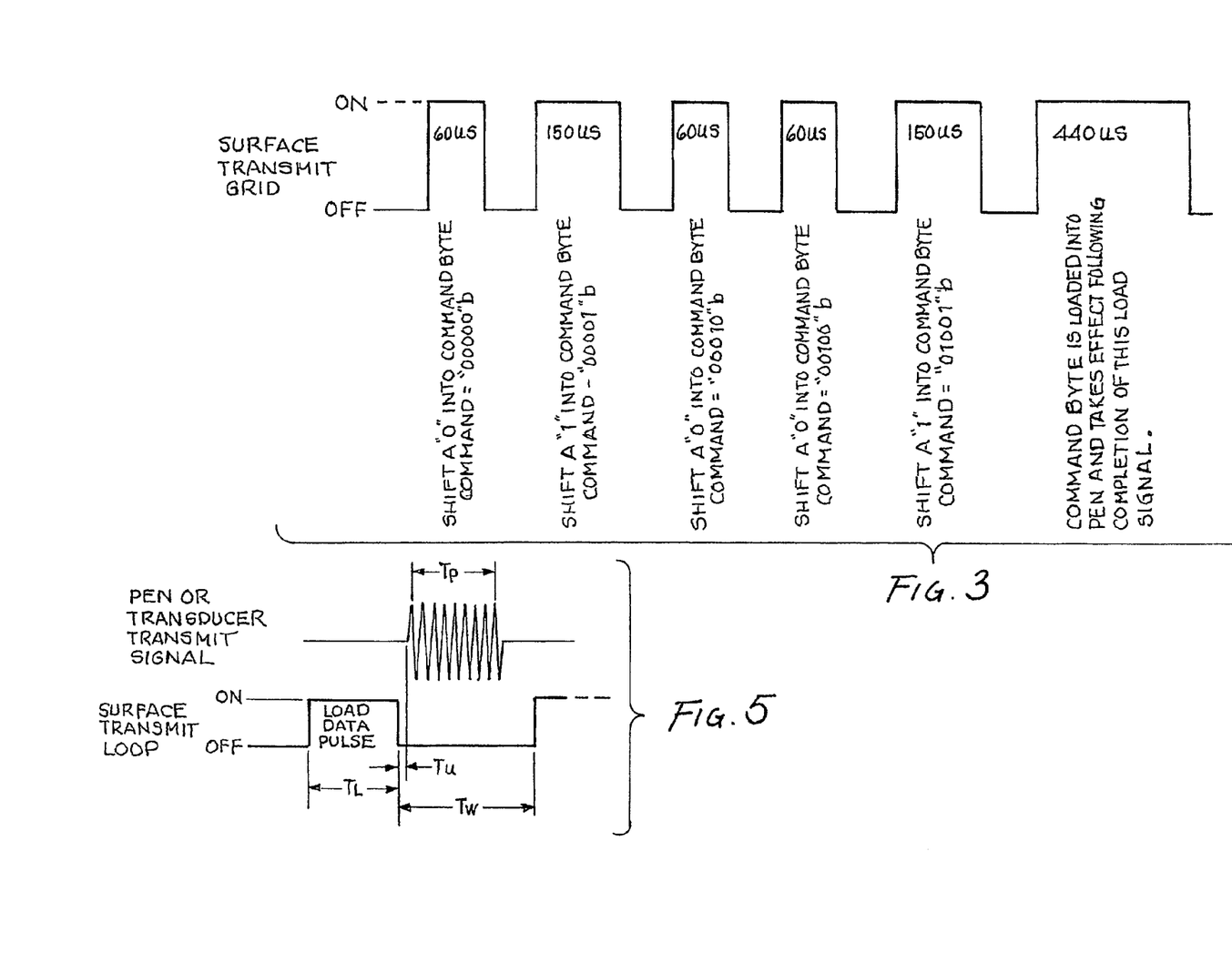
FIG. 3 is a representation of a selected command pulse train.
FIG. 5 is a representation of a load data pulse and a responsive transducer transmit signal.

An example of selecting a command mode may be understood by reference to FIG. 3 which demonstrates a surface instructing a pen or other transducer to change its ID number.

The currently selected pen in proximity of the tablet will now only respond to the surface when the pen or other transducer ID in future commands matches the new ID of this pen or other transducer (which is now a '001').

Figure 4:
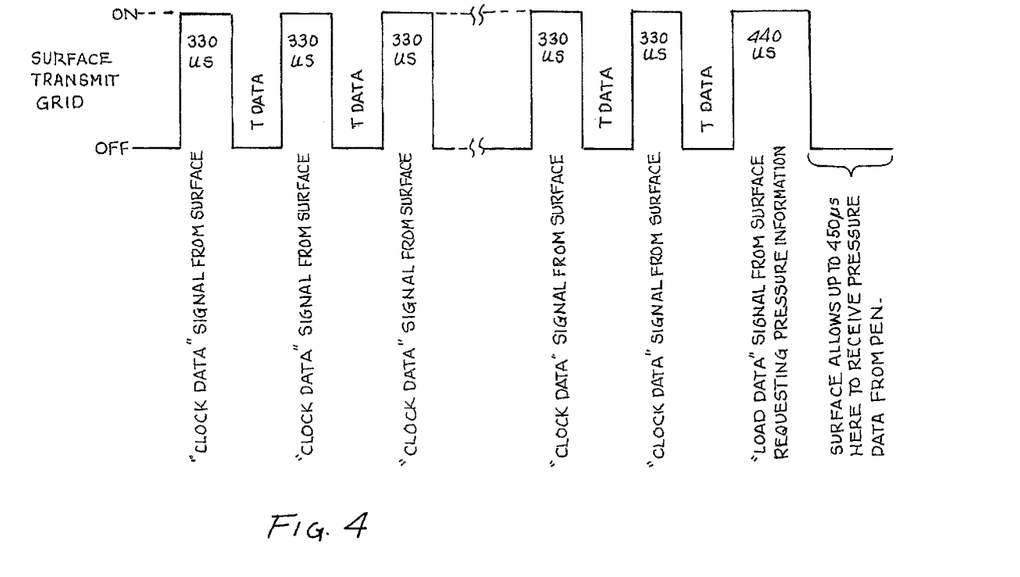
FIG. 4 is a representation of a pulse train illustrating the Clock Data Signal.

An example of what the surface needs to transmit to convert wire data for determining pen or other transducer information, such as pressure, is shown in FIG. 4. Tdata is set for 300 µs if the data being clocked from the pen is a binary '0' value. Tdata is set for 340 µs if the data being clocked from the pen is a binary '1' value. The pen transmits a signal for Tdata time. The surface must allow an additional settling time before issuing another "CLOCK DATA".

Pressure information is clocked out of the pen or other transducer following a "LOAD DATA" pulse. See FIG. 5 and the Timing Table I below. The signal length varies in proportion to the pressure—shorter when the pressure is high and longer when low.

TIMING TABLE I

| Parameter | Definition | Min | Max | Units |
|---|---|---|---|---|
| Tu | Uncertainty time from end of sync to start of pen signal | 0 | 15 | μs |
| Tp | Pen signal 'on' time as related to pressure: | | | |
| | Minimum Pressure | | 420 | μs |
| | Maximum Pressure | 140 | | |
| Tw | Time between Sync pulses for pressure | Tp + 40 | | μs |
| TL | LOAD DATA pulse width | 438 | 448 | μs |

Binary information is clocked out of the pen or other transducer following a "CLOCK DATA" pulse. See the following Timing Table II below and FIG. 6:

TIMING TABLE II

Figure 6:
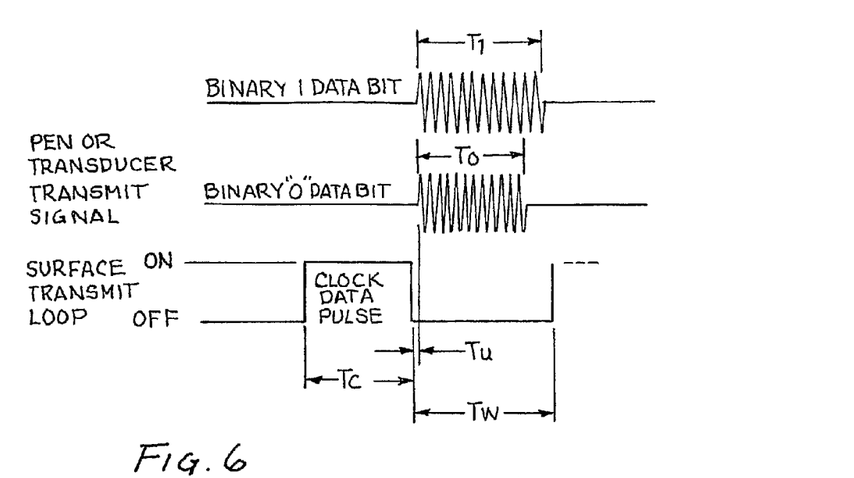
FIG. 6 is a pulse representation with corresponding binary data bits transmitted by a transducer.

| Parameter | Definition | Min | Max | Units |
|---|---|---|---|---|
| Tu | Uncertainty time from end of current sync pulse to start of pen or other transducer signal | 0 | 15 | μs |
| To | Pen or other transducer signal 'on' time representing binary '0' | 300 | 300 | μs |
| T1 | Pen or other transducer signal 'on' time representing binary '1' | 340 | 340 | μs |
| Tw | Time between data bit clock pulses | To + 40 | T1 + 40 | μs |
| Tc | CLOCK DATA pulse width | 320 | 330 | μs |

Data is serial shifted out of the pen or other transducer at a rate of one bit per "CLOCK DATA" pulse. The order for which data is shifted is as follows:

Bit 0: Future tip-switch status.
Bit 1: Side-switch 1 status. This is a binary '1' if the switch is not pressed, '0' if pressed.
Bit 2: Future side-switch 2 status. This is a binary '1' if the switch is not pressed, '0' if pressed.
Bit 3: To be determined for pen or other transducers.
Bit 4: To be determined for pen or other transducers.
Bits 5-7: Pen or other transducer ID bits, where bit 7 is the MSB and bit 5 is the LSB.

Figure 7:
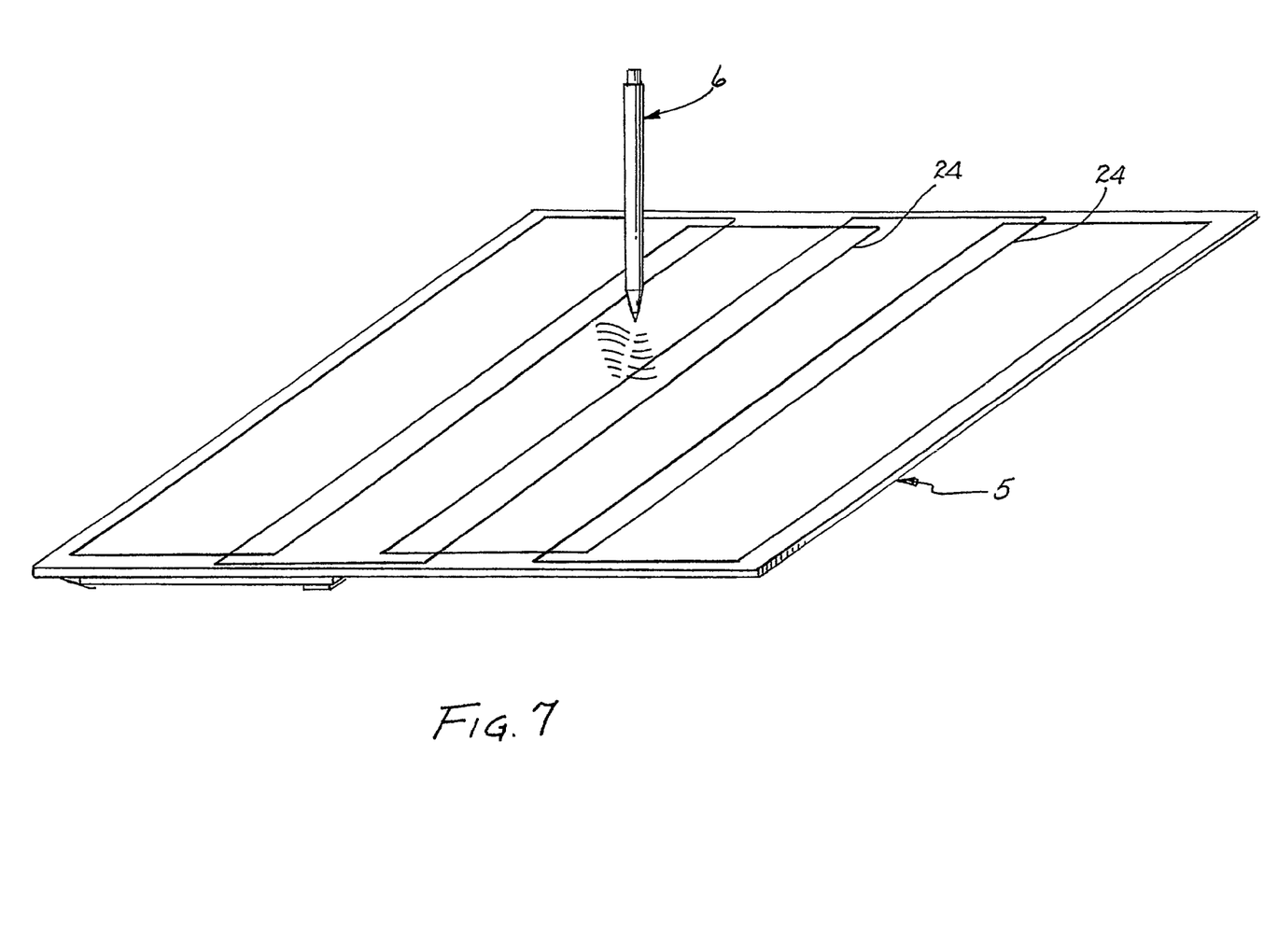
FIG. 7 is a simplified schematic diagram of an embodiment of the present invention.

A simplified schematic diagram of an embodiment of the present invention is shown in FIG. 7. The system includes a surface assembly 5 and a transducer assembly 6. A remote powered pen has been chosen as the transducer, but a mouse, pawn, puck or other transducer could be used. The surface assembly 5 incorporates a transmit grid incorporating overlapping tuned powering loops 24 for transmitting data and power to the transducer.

The surface assembly also includes the necessary controller and interfaces to communicate with the grid and a host PC. The surface also includes an embedded position sensing grid for determining the position of the pen and for sensing non-position data being transmitted by the pen. Alternatively, the surface assembly may include separate data sensing conductors or grid for sensing non-position data transmitted by the pen.

Figure 8:
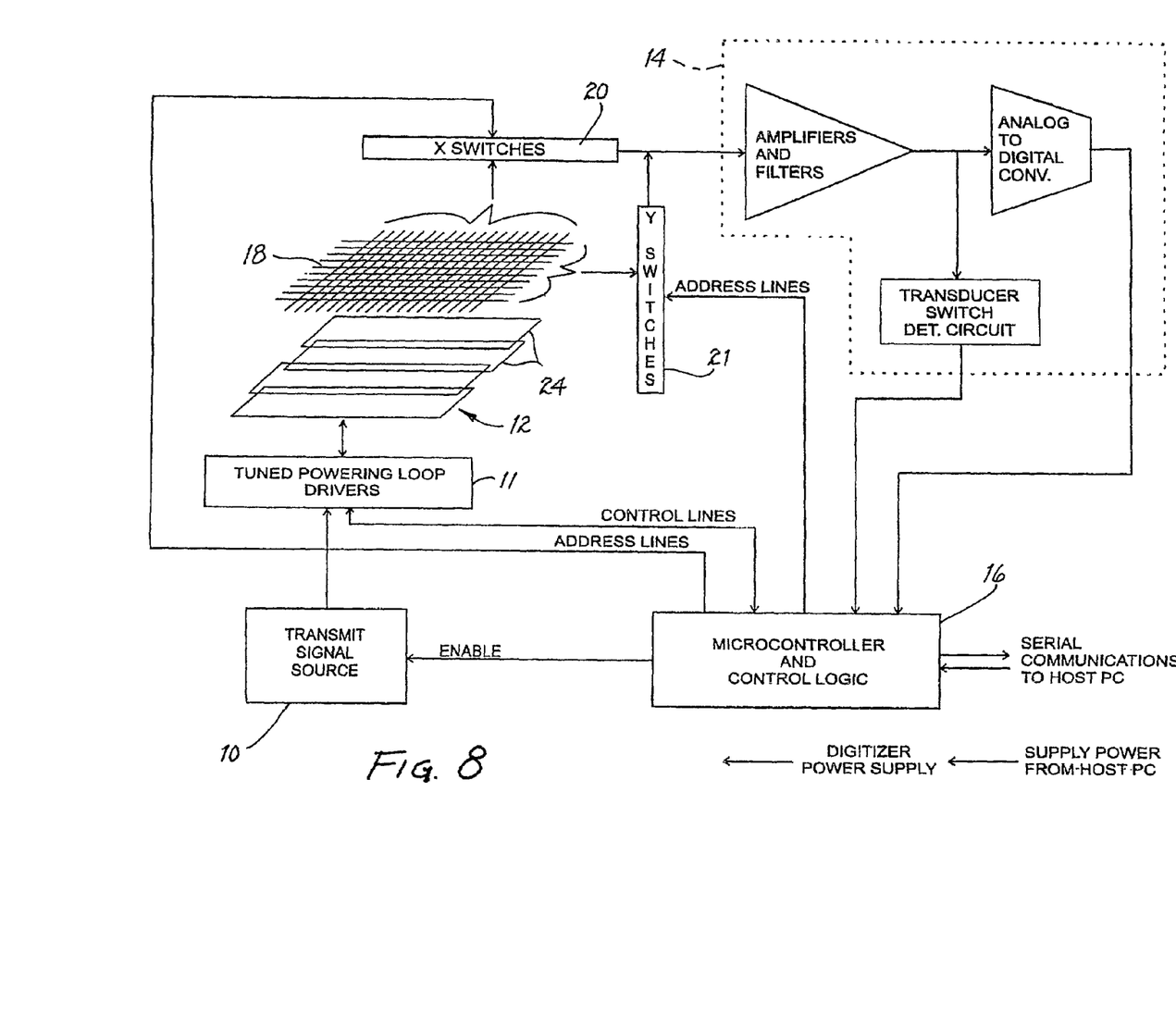
FIG. 8 is a functional block diagram of a surface assembly for use in the system of the present invention.

A typical overall system includes a surface assembly and transducer assemblies. As shown in FIG. 8, the surface assembly includes a transmit signal source 10, tuned powering loop drivers 11, a transmit grid 12, a data receive circuitry 14, and a microcontroller including control logic 16.

The example chosen for illustration incorporates a tablet grid orthogonally arranged position sensing conductors 18 used to derive position information of a transmitting transducer such as a pen. The conductors are selectively addressed using well known addressing techniques including X and Y switches 20 and 21, respectively, and position information is derived from the resulting signals. The present invention provides power to such pens or transducers through the power transmit grid 12 comprising overlapping tuned powering loops 24.

The transmit signal source incorporates a dedicated oscillator or signal source at the operating frequency, or is a source derived from a dedicated or shared source, such as a microprocessor clock, that operates at another frequency, and is up or down-counted or otherwise converted to create the desired transmit signal frequency. The transmit signal source has a transmit enable control line that can be used by the controller to turn on or turn off the signal source or its output. This allows the signal to be turned off in order to reduce background noise and interference when the transducer signal is being received by the surface.

The transmit signal is fed to tuned powering loop drivers 11 that directs the signal to a specific output or address. Under the control of the microcontroller, the signal is fed to one of the selected transmit grid loops 24. The tuned powering loop drivers 11 have an on/off input that is gated by the microcontroller to modulate or turn the selected grid signal on or off. In this embodiment the same circuitry that drives the transmit resonant coils also serves to squelch the coils in order to make them turn off in a short time.

The transmit squelch circuitry is used to squelch or dampen the resonant grid loops when and after their signal sources are turned off. Since the transmit grid loops are resonant they will continue to resonant after the transmit signal is turned off, and therefore will continue to transmit a decaying signal for some time. If not immediately squelched or forced to turn off, it becomes more difficult for the pen or other transducer to discern the exact time the signal is gated off in order to measure its on time, and adds a delay time before the transducer or pen signal can respond. The squelch circuitry consists of individual, or in an IC, bipolar transistors or FET outputs, that when enabled, serve to squelch or short out the selected transmit grid loop under control of the control circuitry.

An alternate method to squelching the transmit grid is to intentionally tune the resonant frequency of the transmit grid to a frequency that is beyond the bandwidth of the position receive circuitry. This tuning method prevents the resonant frequency of an inactive transmit loop from interfering with the position receive circuitry. It also reduces the component count and operating power of the digitizer. As an example, with the position receiver filters tuned to 500 KHz and having a total bandwidth of 60 KHz, it has been found that the transmit loops tuned for 800 KHz but X driven at 500 KHz during the time they are active provides sufficient energy transfer to the transducer yet minimizes the electromagnetic interference between the transmit loops 12 and position receiving conductors 18 during the time that the transmit loops are inactive. The position receiving circuitry rejects the residual energy of the transmit loops because this decaying energy is radiating at their resonant frequency of 800 KHz when not driven by the transmit signal source and is well beyond the bandpass range of the position receiving circuit.

The transmit grid 12 incorporates a series of overlapping resonant loops 24 that when a specific loop is fed a signal from the tuned powering loop drivers 11, it serves to create an electromagnetic signal at the transmit signal frequency. This signal, when on/off gated or modulated, is then the transmit powering and synchronization signal that is sent or transmitted to the pen or other transducers. The signal is not used to locate the transducer position.

The generic tablet grid 18 and following signal amplification circuitry is used to receive transmissions from the pen or other transducer for position resolving purposes. However, the same circuitry is used to receive address, control and data for use by the surface and host computer. After amplification, the received signal is received by the surface data receive circuitry 14 and further amplified, filtered, detected and converted to pulse width or digital data for processing and use. As an alternative, the surface can use its own receive grid and associated circuitry to receive and process digital data received from the pen or other transducers.

A generic magnetic based tablet design is used to independently determine or resolve the position of pens and other transducers while operating within the surface. The surface in itself does not resolve position but does power the pen or transducer and transmits and receives digital data in operation with the pen or other transducer. The control circuitry includes a microcontroller, programmable control logic array or other circuitry to control the surface operation in order to transmit power, synchronization, control, address and other data to pens and other transducers and to receive back, decode and process similar data received from pens or other transducers.

Figure 9:
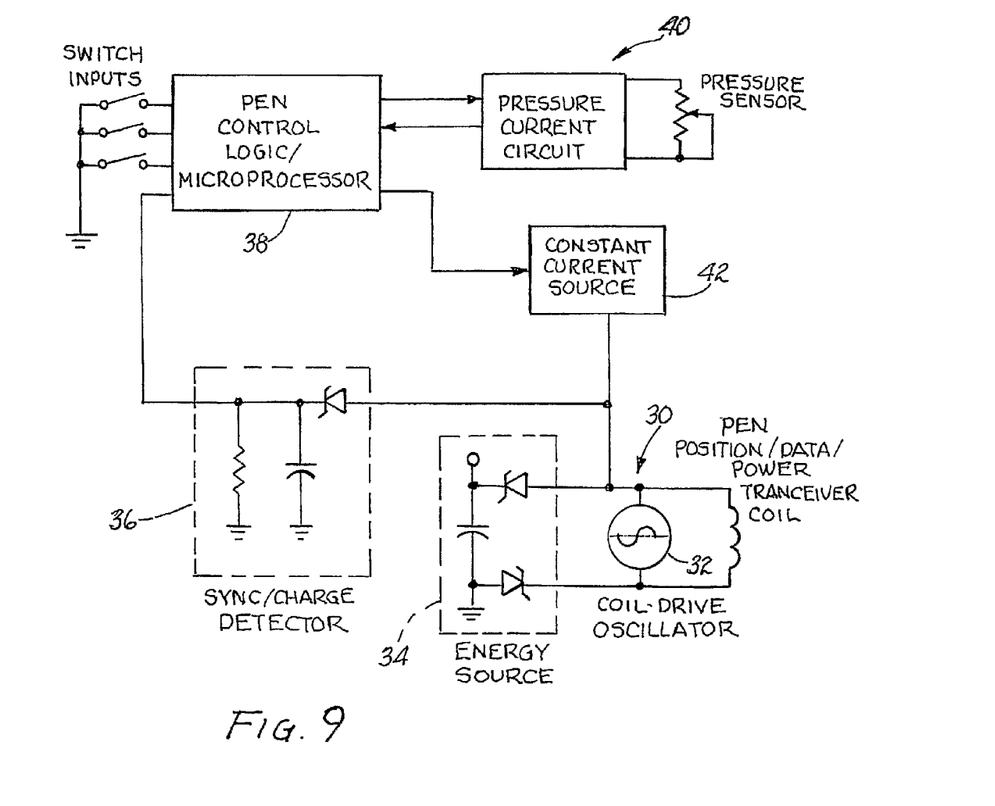
FIG. 9 is a functional block diagram of a transducer assembly useful in the present invention.

A transducer assembly may include standard or high performance pen transducers, mouse, puck, pawn, implements and other transducer assemblies. Pen assemblies, such as shown in FIG. 9, or other transducers include the following: a resonant transceiver 30, resonant and oscillator circuit 32, an energy storage 34, a sync/charge detector 36, a pen control/microprocessor 38, a pressure detector 40, and a constant current source 42.

An inductor based resonant tuned circuit is employed to receive transmitted powering or charging signals from the surface that contain clocking, synchronous, address, control, commands, modes and other data or information. The pen or other transducer is initially idle, with the tuned circuit in a passive or inactive mode, awaiting reception of a signal that causes it to resonant. It is possible to have two or more tuned circuits in a transducer in order to determine its position and angular rotation.

A diode and a low-pass capacitive filter convert the signal received by the tuned circuit into DC operating power to operate the pen or other transducer. The pen or transducer can charge up sufficiently with a single transmission but also can integrate the transmissions over a period of time. The resulting power is highly filtered by the tuned circuit and the resulting low-pass capacitive filter, so that the quality of transmission and the occurrence of background noise or interference, such as from a display, have little impact. It is only necessary that a minimum voltage level be reached and maintained during pen or other transducer transmissions to the surface.

The synch/charge detector receives and detects the presence of a received signal from the surface, and once it reaches a defined threshold level, converts it into a corresponding pulse width or digital code. The detector output then is fed to the control or processor circuitry. If a valid clock, synchronous signal or other control, mode, address or other data is received, then the pen or other transducer responds appropriately.

The pen control circuitry or microprocessor, when powered, receives and processes signals from the surface. In response to the correct clock, signal sync, address, mode control and commands the pen responds by initiating a corresponding transmission to the surface. For example, if pressure sensor information is properly requested then it responds by transmission of the appropriate pressure sensor signal to the surface. If it receives mode commands then it will set its operation to match the commands and wait for further input. For example, it may receive a command to assign an address. Afterwards it will respond only to that address. Alternatively, if it receives digital data for storage in the pens or other transducer, then it will respond by storing the data in memory.

Many other sensors and indicators can be connected to the control circuitry or microprocessor. For example, mouse buttons, a keypad, an indicator lamp of display, a mode button or numerous other switches or sensors for use in a mouse pawn, puck, implement or other transducer.

A pressure sensor is used to detect pen tip pressure or other pressure sensors such as a side sensor or eraser sensor. In one embodiment, the sensor may comprise a resistive element and dome assembly whose resistance goes down with pressure after reaching a certain minimum level. The actual sensor technique is not critical and other methods can be employed. The pressure is converted into a voltage level that is fed to the processor analog input port and is then used to vary the length of the pen or transducer transmit signal in proportion to the pressure—the greater the pressure the shorter the signal length. The length of the signal is then used to communicate to the surface the amount of the pressure.

The constant current source is used to provide drive current to activate and operate an active oscillator that in turn creates power in the inductive resonant tuned circuitry. Since the source provides a constant current it provides a constant transmit signal level with varying pen or other transducer power levels. Most significantly, the generated pen signal directly drives the resonance circuit so that the transmitted resolution or length of the resulting signal, operating at high frequency, is a direct function of the oscillator and not the control circuitry or microprocessor clock speed or resolution.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed is:

1. A surface and cordless transducer system, the system comprising:

a surface including a position resolving grid, and a transducer including a power receiving circuit, wherein the power receiving circuit responds to an electromagnetic field radiating from the surface and sends a transmit signal, which is received by the position resolving grid and used to determine a position of the transducer relative to the surface, wherein the surface further includes a plurality of power transmission coils, which are distinct from the position resolving grid, for radiating the electromagnetic field, the plurality of power transmission coils being overlapping resonant power transmission coils that are configured to generate current multiplication associated with resonance therein; and wherein the position resolving grid and the plurality of overlapping resonant power transmission coils are arranged coextensively on top of one another to form the surface.

2. The surface and cordless transducer system of claim 1, wherein the plurality of overlapping resonant power transmission coils comprise transmission coils of the resonant inductive type.

3. The surface and cordless transducer system of claim 1, wherein the transducer includes an energy storage portion that is configured to generate and store DC operating power for operating the transducer based on a signal from the power receiving circuit in response to the electromagnetic field radiating from the plurality of overlapping resonant power transmission coils arranged on the surface.

4. The surface and cordless transducer system of claim 1, wherein each of the plurality of overlapping resonant power transmission coils, when inactive, is configured to be tuned to a frequency that is different from its operating frequency so as to minimize an electromagnetic interference between the resonant power transmission coil and the position resolving grid.

5. The surface and cordless transducer system of claim 1, wherein the plurality of overlapping resonant power transmission coils are configured to be squelched when the surface is receiving a transmit signal from the transducer.

6. The surface and cordless transducer system of claim 1, wherein the transducer is configured to perform a predefined modulation on a transmit signal to be sent to the position resolving grid.

7. The surface and cordless transducer system of claim 6, wherein the predefined modulation comprises a time keying modulation or an on/off modulation.

8. The surface and cordless transducer system of claim 1, wherein the transducer includes a low current source that is configured to provide a constant transmit signal level.

9. A method for determining a position of a transducer relative to a surface, wherein the surface includes a position resolving grid and the transducer includes a power receiving circuit, the method comprising:
  causing the power receiving circuit to respond to an electromagnetic field radiating from the surface and to send a transmit signal, and
  causing the position resolving grid to receive the transmit signal from the transducer to thereby determine a position of the transducer relative to the surface,
  wherein the surface further includes a plurality of power transmission coils, which are distinct from the position resolving grid, the plurality of power transmission coils being overlapping resonant power transmission coils that are configured to generate current multiplication associated with resonance therein, and wherein the position resolving grid and the plurality of overlapping resonant power transmission coils are arranged coextensively on top of one another to form the surface, and the method further comprises:
  causing the plurality of overlapping resonant power transmission coils to radiate the electromagnetic field.

10. The method of claim 9, wherein the plurality of overlapping resonant power transmission coils comprise transmission coils of the resonant inductive type.

11. The method of claim 9, wherein the transducer includes an energy storage portion, and the method further comprises causing the energy storage portion to generate and store DC operating power for operating the transducer based on a signal from the power receiving circuit in response to the electromagnetic field radiating from the plurality of overlapping resonant power transmission coils.

12. The method of claim 9, further comprising tuning each of the plurality of overlapping resonant power transmission coils, when inactive, to a frequency that is different from its operating frequency so as to minimize an electromagnetic interference between the resonant power transmission coil and the position revolving grid.

13. The method of claim 9, further comprising squelching the plurality of overlapping resonant power transmission coils when the surface is receiving a transmit signal from the transducer.

14. The method of claim 9, further comprising causing the transducer to perform a predefined modulation on a transmit signal to be sent to the position resolving grid.

15. The method of claim 14, wherein the predefined modulation comprises a time keying modulation or an on/off modulation.

16. The method of claim 9, wherein the transducer includes a low current source that is configured to provide a constant transmit signal level.

* * * * *

UNITED STATES PATENT AND TRADEMARK OFFICE
CERTIFICATE OF CORRECTION

| | | |
|---|---|---|
| PATENT NO. | : 7,868,873 B2 | Page 1 of 1 |
| APPLICATION NO. | : 10/598460 | |
| DATED | : January 11, 2011 | |
| INVENTOR(S) | : Steven M. Palay et al. | |

It is certified that error appears in the above-identified patent and that said Letters Patent is hereby corrected as shown below:

Title Page Item 60
Related U.S. Application Data should read, --Provisional application No. 60/558,417 filed April 1, 2004--.

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,868,873 B2 | Page 1 of 1 |
| APPLICATION NO. | : 10/598460 | |
| DATED | : January 11, 2011 | |
| INVENTOR(S) | : Palay et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this
Fourteenth Day of June, 2011

David J. Kappos
*Director of the United States Patent and Trademark Office*